US008263895B2

(12) United States Patent  (10) Patent No.: US 8,263,895 B2
Humphrey  (45) Date of Patent: Sep. 11, 2012

(54) ELECTRO-DISCHARGE ELECTRODE AND METHOD OF USE

(75) Inventor: Mark Lee Humphrey, Elmira, NY (US)

(73) Assignee: Corning Incorporated, Corning, NY (US)

( * ) Notice: Subject to any disclaimer, the term of this patent is extended or adjusted under 35 U.S.C. 154(b) by 582 days.

(21) Appl. No.: 12/549,975

(22) Filed: Aug. 28, 2009

(65) Prior Publication Data

US 2011/0049107 A1   Mar. 3, 2011

(51) Int. Cl.
*B23H 1/06* (2006.01)
(52) U.S. Cl. ............... 219/69.15; 219/69.17; 219/69.18
(58) Field of Classification Search ............... None
See application file for complete search history.

(56) References Cited

U.S. PATENT DOCUMENTS

| | | | | |
|---|---|---|---|---|
| 4,287,749 A * | 9/1981 | Bachrach et al. | ............... | 72/467 |
| 4,574,459 A * | 3/1986 | Peters | ........................ | 29/527.4 |
| 5,026,422 A * | 6/1991 | Osborne | .................... | 106/14.11 |
| 5,714,228 A | 2/1998 | Beckmeyer et al. | ......... | 428/118 |
| 6,290,837 B1 * | 9/2001 | Iwata et al. | .................... | 205/665 |
| 6,448,530 B1 | 9/2002 | Fujita et al. | ................ | 219/69.17 |
| 6,570,119 B2 * | 5/2003 | Marcher | ................... | 219/69.17 |
| 6,641,385 B2 | 11/2003 | Fujita et al. | .................... | 425/380 |
| 7,335,848 B2 | 2/2008 | Hironaga et al. | ......... | 219/69.17 |
| 7,952,208 B2 * | 5/2011 | Fujita et al. | .................... | 257/778 |
| 7,982,158 B2 * | 7/2011 | Koishikura et al. | ........ | 219/69.17 |
| 8,138,441 B2 * | 3/2012 | Forenz et al. | .............. | 219/69.17 |
| 2002/0153356 A1 * | 10/2002 | Fujita et al. | ................ | 219/69.17 |
| 2003/0042229 A1 * | 3/2003 | Marcher | .................... | 219/69.17 |
| 2004/0161583 A1 * | 8/2004 | Brew et al. | ..................... | 428/116 |
| 2005/0110507 A1 * | 5/2005 | Koizumi et al. | .............. | 324/754 |
| 2006/0034972 A1 * | 2/2006 | Takahashi et al. | ........... | 425/462 |
| 2006/0091016 A1 * | 5/2006 | Avery et al. | .................... | 205/101 |
| 2006/0178769 A1 * | 8/2006 | Brew et al. | ..................... | 700/122 |
| 2008/0196237 A1 * | 8/2008 | Shinya et al. | .................... | 29/557 |
| 2008/0223828 A1 | 9/2008 | Forenz et al. | .............. | 219/69.15 |
| 2009/0081325 A1 * | 3/2009 | Kitamura et al. | ............. | 425/461 |
| 2009/0218322 A1 * | 9/2009 | Folmar et al. | ................ | 219/69.17 |
| 2010/0305900 A1 * | 12/2010 | Folmar et al. | ................. | 702/155 |
| 2011/0049103 A1 * | 3/2011 | Humphrey | ..................... | 216/74 |

* cited by examiner

*Primary Examiner* — David E Graybill
(74) *Attorney, Agent, or Firm* — Matthew B. McNutt (57) ABSTRACT

An electrode for machining a pattern in a workpiece has a conductive body with a lattice of closed cells and a plurality of open cells. The open cells are positioned at an edge of the lattice of closed cells. The closed cells are defined by interconnected webs, and the open cells are defined by fins extending from the interconnected webs. A thickness of the fins is less than a thickness of the webs. In use, the electrode is positioned at a plurality of locations on the workpiece, such that a position of the fins of the electrode at each location overlaps a position of the fins of the electrode at an adjacent location. The pattern is formed at each of the plurality of locations by passing electrical charges repeatedly between the electrode and the workpiece and advancing the electrode into the workpiece.

12 Claims, 7 Drawing Sheets

ELECTRO-DISCHARGE ELECTRODE AND METHOD OF USE

BACKGROUND

The disclosure relates to electro-discharge machining (EDM) processes, and more particularly to plunge EDM for making a honeycomb extrusion die with reduced slot width variability.

Honeycomb bodies used in catalyst substrate and particulate filtration applications consist of a monolith body having longitudinal, parallel channels defined by longitudinal interconnected webs. The honeycomb bodies are typically made by extruding a plasticized batch material that forms a ceramic material such as cordierite, aluminum titanate or silicon carbide after firing. Extrusion dies used in making the honeycomb bodies have a die body with a discharge end including an array of longitudinal pins defined by interconnected slots. The array of longitudinal pins may include pins having any geometry useful in catalyst substrate and particulate filtration applications, such as rectangular, triangular, or hexagonal. The inlet end of the die body includes feedholes which extend from a base of the die body to the interconnected slots and are used to supply batch material to the slots. To make a honeycomb body using the extrusion die, plasticized batch material is supplied to the feedholes and extruded through the interconnected slots. The batch material extruded through the interconnected slots forms the interconnected webs of the honeycomb body.

Honeycomb extrusion dies are commonly made using plunge EDM processes. In a typical plunge EDM process, a shaped electrode having the desired pin/slot pattern is closely spaced from a workpiece that will become the extrusion die in a bath of dielectric fluid. A voltage is applied across the shaped electrode and the workpiece to cause current to flow between them through the dielectric fluid. In some processes, the shaped electrode is operated under positive polarity, and the workpiece is operated under negative polarity; in other processes, and depending under some circumstances on the composition of the electrode, the current flow may be reversed. The pin/slot pattern is formed in the workpiece by a series of repetitive electrical discharges in the thin gap between the shaped electrode and the workpiece. The electrical discharges generate enough heat to melt the workpiece and transfer the pin/slot pattern of the electrode to the workpiece. As mentioned above, while machining the workpiece, the workpiece is immersed in dielectric fluid, which acts as a conductor for the electrical discharges and at the same time insulates the shaped electrode from the workpiece. The dielectric fluid also serves as a coolant and is used to flush machined chips out of the thin gap between the shaped electrode and the workpiece.

While plunge EDM lends itself well to machining pins and slots of various shapes and sizes within the same extrusion die body, a significant amount of variation in slot width and pin size within a machined extrusion die body has also been observed. Variation in slot width and pin size across the extrusion die translates to variation in web thickness and cell size across the honeycomb body formed with the extrusion die. Significant variation in web thickness and cell size across the honeycomb body can create an undesired thermal distribution profile and/or flow distribution profile in the honeycomb body during subsequent processing or use of the honeycomb body. Thus there is a desire for a plunge EDM process that forms patterns in a workpiece with uniform variation in pattern size across the workpiece, wherein the variation can be controlled to meet manufacturing tolerances.

SUMMARY

One embodiment is an electrode for machining a pattern in a workpiece. The electrode comprises a conductive body having a lattice of closed cells and a plurality of open cells. The open cells are positioned at an edge of the lattice of closed cells. The closed cells are defined by interconnected webs, and the open cells are defined by fins extending from the interconnected webs. A thickness of the fins is less than a thickness of the webs.

A further embodiment includes a method of machining a pattern in a workpiece. The method includes providing a shaped electrode including the pattern. The pattern is defined by interconnected webs forming a lattice of closed cells, and fins extending from the interconnected webs to form open cells along at least one edge of the lattice of closed cells. A thickness of the fins is less than a thickness of the webs. The electrode is positioned at a plurality of locations on the workpiece, wherein a position of the fins of the electrode at each location overlap a position of the fins of the electrode at an adjacent location. The pattern is formed at each of the plurality of locations by passing electrical charges repeatedly between the electrode and the workpiece and advancing the electrode into the workpiece.

A further embodiment includes a method of machining a pattern in a workpiece. The method includes providing a shaped electrode including the pattern. The pattern is defined by interconnected webs forming a lattice of closed cells, and fins extending from the interconnected webs to form open cells along at least one edge of the lattice of closed cells. A thickness of the fins is less than a thickness of the webs. The electrode is positioned at a first location on the workpiece, and the pattern is formed at the first location by passing electrical charges repeatedly between the electrode and the workpiece and advancing the electrode into the workpiece. The electrode is then positioned at a subsequent location on the workpiece such that a position of the fins of the electrode in the subsequent location overlaps a position of the fins of the electrode in the first location. The pattern is then formed at the subsequent location by passing electrical charges repeatedly between the electrode and the workpiece and advancing the electrode into the workpiece.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Reference will now be made in detail to exemplary embodiments which are illustrated in the accompanying drawings. In describing the embodiments, numerous specific details are set forth in order to provide a thorough understanding to the reader. However, it will be apparent to one skilled in the art that some or all of these specific details may not be necessary. In other instances, well-known features and/or process steps have not been described in detail so as not to unnecessarily obscure aspects of the exemplary embodiments. Whenever possible, the same reference numerals will be used throughout the drawings to refer to the same or like parts.

Figure 1:
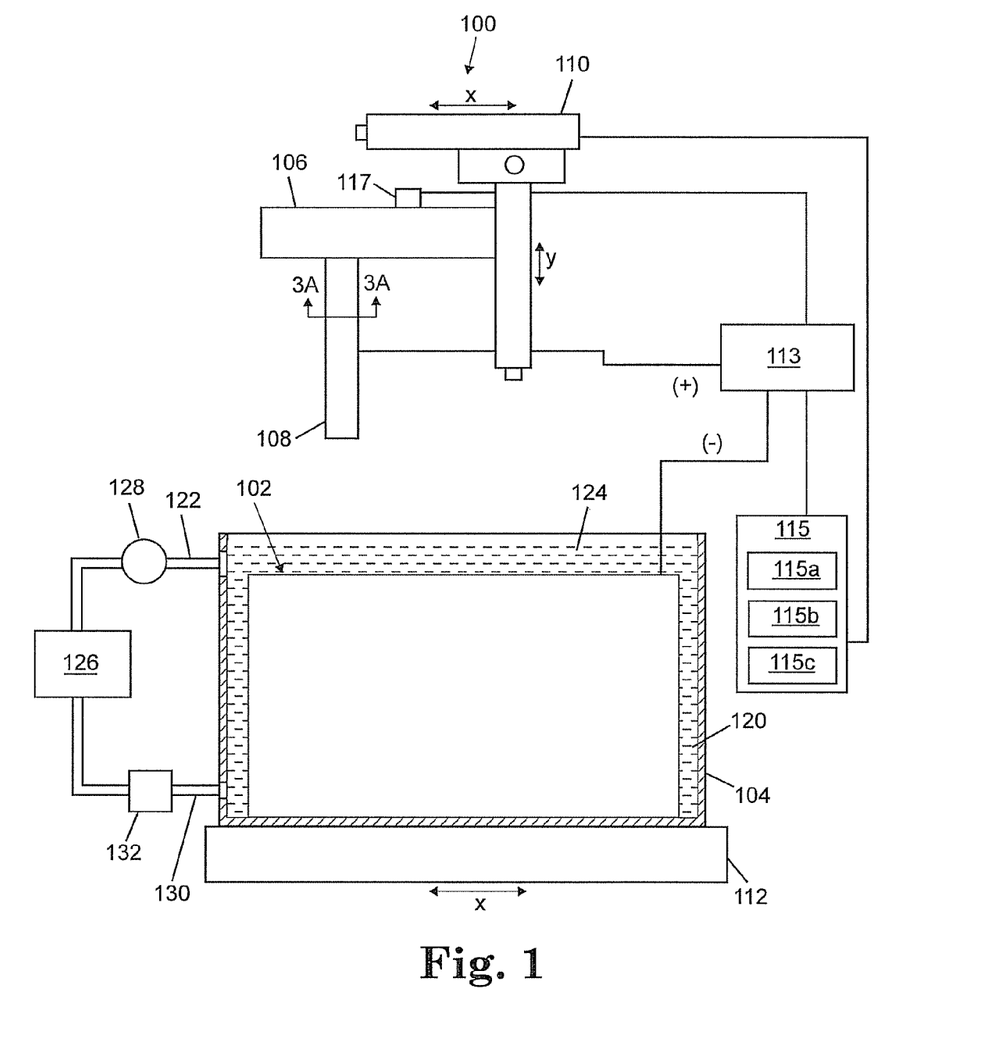
FIG. 1 is a schematic illustration of a plunge EDM system.

FIG. 1 is a simplified diagram of a plunge EDM system 100 for machining patterns, such as slot and pin patterns, across a workpiece 102. Typically, these patterns have features with a high aspect ratio, but the system is not limited to features having a high aspect ratio. The system 100 includes a lower fixture 104 that holds the workpiece 102. The system 100 further includes an upper fixture 106 arranged in opposing relation to the lower fixture 104. The upper fixture 106 holds and supports one or more shaped electrodes 108 in opposing relation to the workpiece 102. The shaped electrode 108 may be held in the upper fixture 106 using any suitable means. For example, the shaped electrode 108 could be inserted in apertures in the upper fixture 106 and fixed thereto by any suitable means, such as welds or threads.

The upper fixture 106 is movable relative to the lower fixture 104 so that the shaped electrode 108 can be positioned to machine features across the workpiece 102 and so that the shaped electrodes 108 can be advanced or plunged into the workpiece 102 as the features are machined to full depth. This could be implemented, for example, by coupling a positioning device 110, such as an actuator(s) or translation stage(s), to the upper fixture 106. In one example, the positioning device 110 provides motion along two orthogonal axes, e.g., in the x and y directions. This would allow lateral and vertical motion of the shaped electrode 108 relative to the workpiece 102. Alternatively, the positioning device 110 may provide motion along three orthogonal axes and may allow angular adjustment of the shaped electrode 108 as necessary. Preferably, the positioning device 110 is controllable. Preferably, the positioning device 110 can position the shaped electrode 108 across the workpiece 102 with high precision. It is also possible to couple a positioning device 112 to the lower fixture 104 so that the workpiece 102 is movable relative to the shaped electrode 108. In this case, the positioning device 110 need provide motion only in the vertical direction.

The plunge EDM system 100 includes a power supply 113 for applying a voltage across the workpiece 102 and the shaped electrode 108. In the configuration illustrated in FIG. 1, the shaped electrode 108 is operated under positive polarity, and the workpiece 102 is operated under negative polarity. Preferably, the output of the power supply 113 is adjustable. The system 100 may include a control device 115 that determines the amount of voltage and the length of time it is applied across the shaped electrode 108 and the workpiece 102. The amount of voltage and length of time it is applied across a shaped electrode 108 and the workpiece 102 determines the electrical discharge between the shaped electrode 108 and the workpiece 102 and the size of the gap formed between the shaped electrode 108 and the workpiece 102. The control device 115 may also control the positioning device 110 to move the shaped electrode 108 to machine features at various locations in the workpiece 102. The control device 115 may receive input from a position sensor 117 coupled to the upper fixture 106, or from the positioning device 110, and use the input to determine when features have been machined to full depth in the workpiece 102. The control device 115 may include memory 115a for storing data and instructions, processor 115b for executing instructions, and input/output devices 115c for communicating with the various components of the plunge EDM system 100.

In the system illustrated in FIG. 1, the lower fixture 104 is provided with a fluid chamber 120 for holding dielectric fluid 124. The plunge EDM system 100 may include an inlet line 122 through which dielectric fluid 124 from a dielectric fluid source 126 can be supplied into the chamber 120. A pump 128 may be provided in the inlet line 122 to pump dielectric fluid 124 from the dielectric fluid source 126 into the chamber 120. The system 100 may include a discharge line 130 through which dielectric fluid 124 can be withdrawn from the chamber 120 and returned to the dielectric fluid source 126. A particulate filter 132 may be provided in the discharge line 130 to remove chips from the dielectric fluid 124 prior to returning the dielectric fluid 124 to the dielectric fluid source 126. The lower fixture 104 supports the workpiece 102 in the chamber 120 such that the workpiece 102 is immersed in the dielectric fluid 124. The dielectric fluid 124 is circulated through the chamber 120 while features are machined in the workpiece 102. The dielectric fluid 124 conducts electrical charges from the shaped electrode 108 to the workpiece 102 while also insulating the shaped electrode 108 from the workpiece 102. The dielectric fluid 124 also flushes chips from the gap formed between the workpiece 102 and the shaped electrode 108. Although not shown in FIG. 1, system modifications are known that additionally provide for circulation of the dielectric fluid through channels in electrode 108 as well as through open channels provided in workpiece 102, such circulation being particularly effective to assist in the flushing of chips from that gap and from slot depressions being machined into the workpiece.

The shaped electrode 108 is positioned for machining features in the workpiece 102 through repetitive electrical charges discharged into a gap between the shaped electrode 108 and the workpiece 102. The shaped electrode 108 is made of a conductive material. The workpiece 102 is also made of a conductive material. The material for the workpiece 102 may be selected based on the intended application of the machined workpiece. For example, for a workpiece 102 that is a blank for a honeycomb extrusion die, the workpiece 102 may be made of hard conductive materials, such as steel. The material of the shaped electrode 108 may or may not be the same as the material of the workpiece 102 and need not be as hard as the material of the workpiece 102. Typically, the shaped electrode 108 is made of a material such as copper-tungsten, although other electrode materials such as graphite could alternatively be used.

The shaped electrode 108 includes a pattern of the features to be formed in the workpiece 102. For example, for a honeycomb extrusion die having a lattice of interconnected webs, the shaped electrode 108 includes a lattice of interconnected webs forming a honeycomb pattern or a portion of a honeycomb pattern. Each shaped electrode 108 is configured to form multiple features (e.g., multiple rows and columns of pins and slots) at a time. In general, the shaped electrode 108 may be configured to form patterns with features of any desired shape. In one embodiment, the pattern to be formed in a workpiece is an array of polygonal pins (e.g., rectangular, square, hexagonal, or triangular pins) and slots. The design and operation of shaped electrode 108 is described in greater detail below.

The plunge EDM process is a step-down process whereby multiple plunge steps in varying sequences are used to machine features to full depth across a workpiece. The step-down plunge EDM process provides more consistent machining conditions across the workpiece by varying the plunging sequence over partial slot depth increments instead of plunging to full depth with each pass. In some implementations, the plunging sequence may be randomized.

Figure 2:
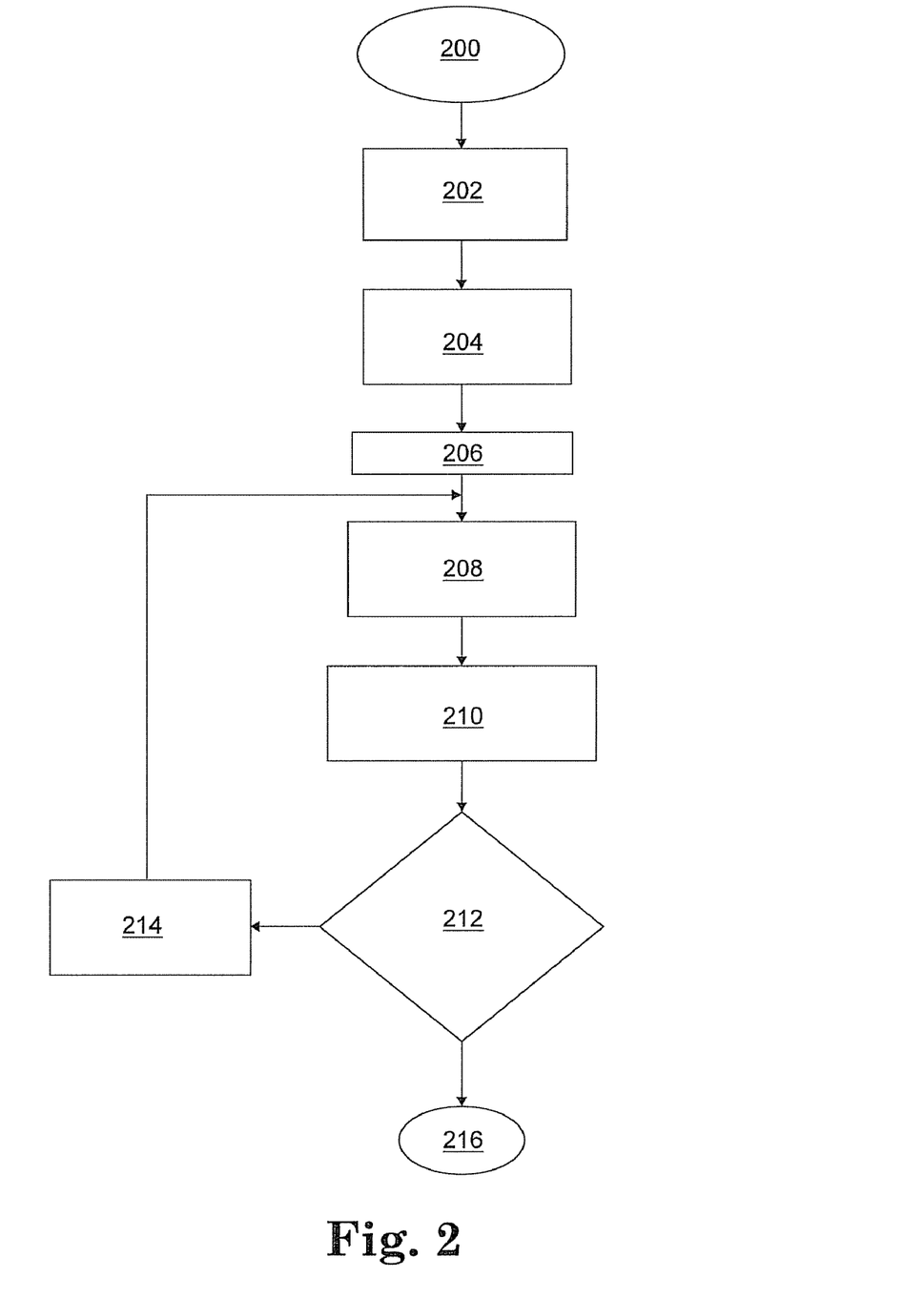
FIG. 2 is a flowchart illustrating a step-down plunge EDM process.

FIG. 2 illustrates one embodiment of a step-down plunge EDM process. First, the full depth of the pattern to be formed in the workpiece is determined (200). Next, the number of total number of plunge steps desired to machine each pattern to full depth is selected (202). This total number should be at least two, preferably greater than two, more preferably greater than five. Next, the plunge depth for each plunge step is determined (204). The plunge depth is a fraction of the full depth of the pattern that the shaped electrode would machine in the workpiece during a plunge step. The plunge depth may or may not differ from one plunge step to the next. Next, the plunge step is set to 1 (206). Next, a sequence of plunge locations is generated (208). The plunge locations are the locations on the workpiece where the shaped electrodes would form patterns in the workpiece. The sequence of plunge locations may be randomized, or may be a varying non-random sequence for each plunge step. For the current plunge step, patterns are machined in the workpiece for the plunge depth associated with the current plunge step according to the generated plunge sequence (210). The next step is to check if the plunge step is equal to the total number of plunge steps (212). If the plunge step is equal to the total number of plunge steps, the process is terminated (214). If the plunge step is not equal to the total number of plunge steps, the plunge step is incremented by 1 and the process is repeated from step 208. The step-down plunge EDM process may be provided as instructions that could be executed by the processor (115b in FIG. 1).

As noted above, the shaped electrode 108 includes a pattern of the features to be formed in the workpiece 102. Referring to FIGS. 3A through 3D, exemplary embodiments of a shaped electrode 108 for machining a pattern in a workpiece are illustrated. In the exemplary embodiment of FIG. 3A-3D, the pattern formed in the workpiece is an array of hexagonal pins and slots. In the exemplary embodiment of FIG. 3E, the pattern formed in the workpiece is an array of square pins and slots. In other embodiments, other pin shapes (e.g., rectangular, triangular or other polygonal pins) or combinations of pin shapes, or pins of similar shapes but different sizes may be formed, as will be recognized by one skilled in the art.

Referring again to FIG. 3A, the exemplary shaped electrode 108 is formed from a conductive body 300 having a lattice 302 of closed cells 304 and a plurality of open cells 306. The open cells 306 are positioned at an edge 308 of the lattice 302 of closed cells 304. In the illustrated embodiment, the open cells 306 are positioned at opposing edges 308 of the lattice 302 of closed cells 304. In other embodiments, the open cells 306 are positioned at more than two edges 308 of the lattice 302 of closed cells 304 (e.g., on all edges of lattice 302). The closed cells 304 forming lattice 302 are defined by interconnected webs 310, and the open cells 306 are defined by fins 312 extending from the interconnected webs 310. For reasons that are explained below, the webs 310 have a thickness $t_w$, and the fins 312 have a thickness $t_f$ that is less than the thickness $t_w$ of interconnected webs 310. In one embodiment, the thickness $t_f$ of fins 312 is in the range of about 0.0001 inches to about 0.0003 inches less than the thickness $t_w$ of interconnected webs 310. In one embodiment, the thickness $t_f$ of fins 312 is about 0.0002 inches less than the thickness $t_w$ of interconnected webs 310. The thickness $t_w$ of the webs 310 will depend upon the desired thickness of the slots to be formed in the workpiece 102, and webs 310 may therefore have any desired thickness. In some embodiments, the thickness $t_w$ of webs 310 may be in the range of about 0.0025 inches to about 0.0040 inches.

Figure 3A:
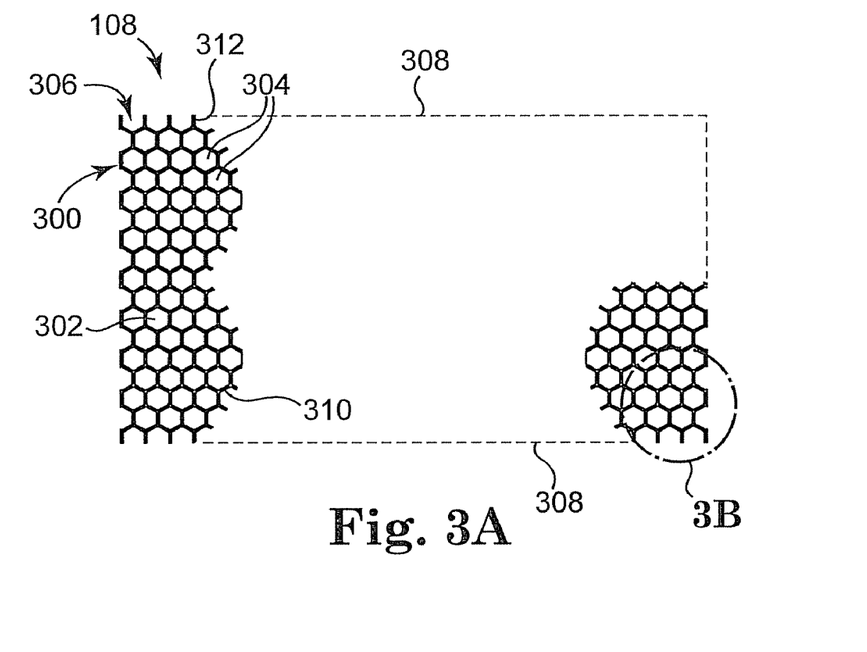
FIG. 3A is a transverse cross-section of a shaped electrode for forming hexagonal pins in an extrusion die.
Figure 3B:
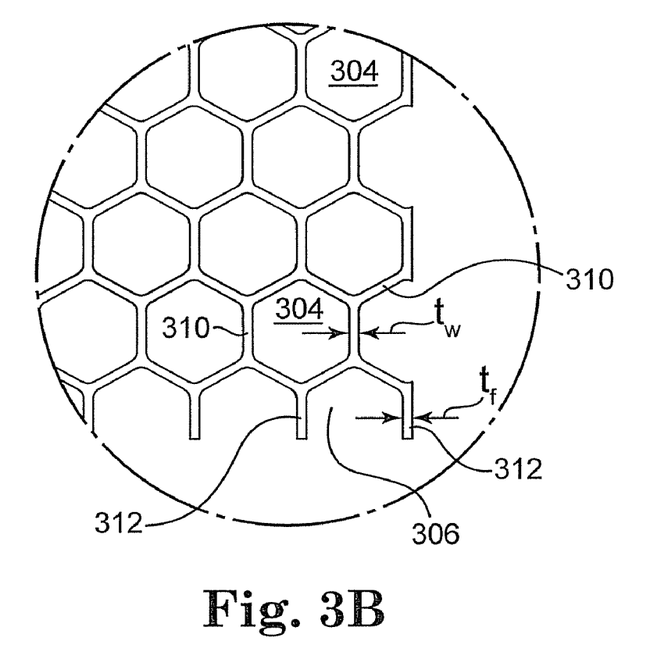
FIG. 3B is a greatly enlarged view of a portion of the electrode of FIG. 3A.
Figure 3C:
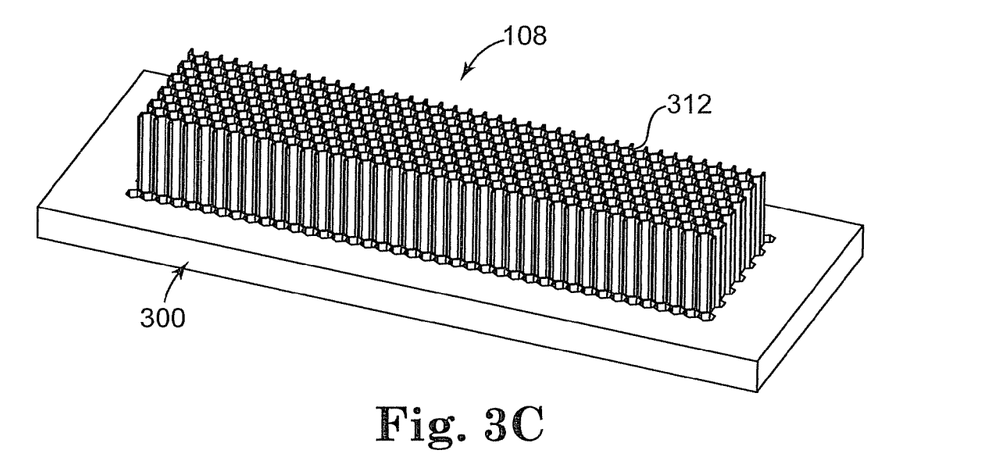
FIG. 3C is a perspective view of the shaped electrode of FIG. 3A.
Figure 3D:
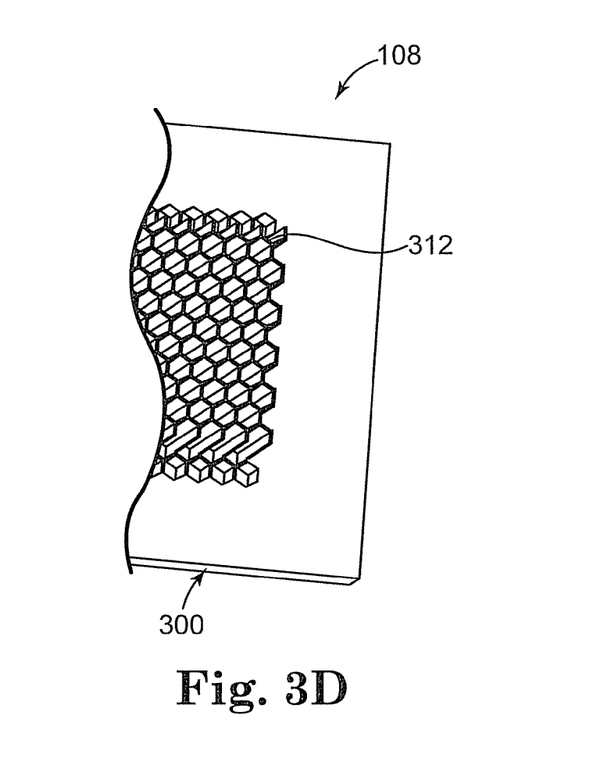
FIG. 3D is an enlarged perspective view of a portion of the shaped electrode of FIG. 3C FIG. 3E a transverse cross-section of a shaped electrode for forming square pins in an extrusion die.
Figure 3E:
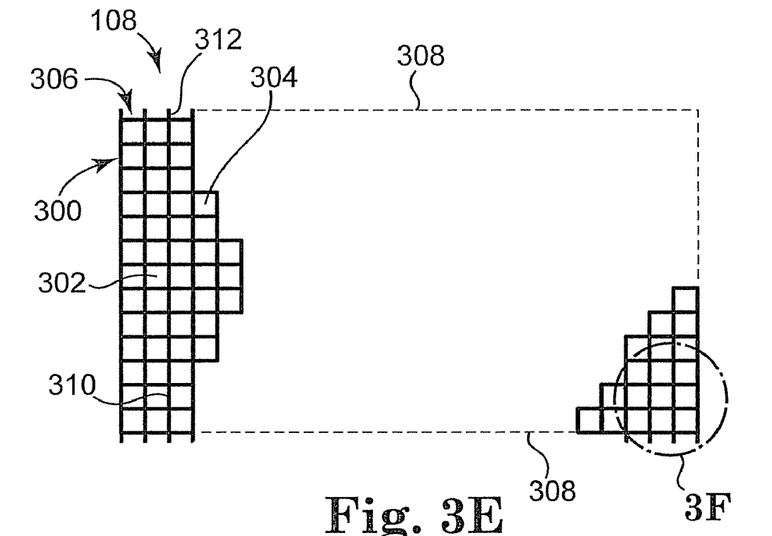
Figure 3F:
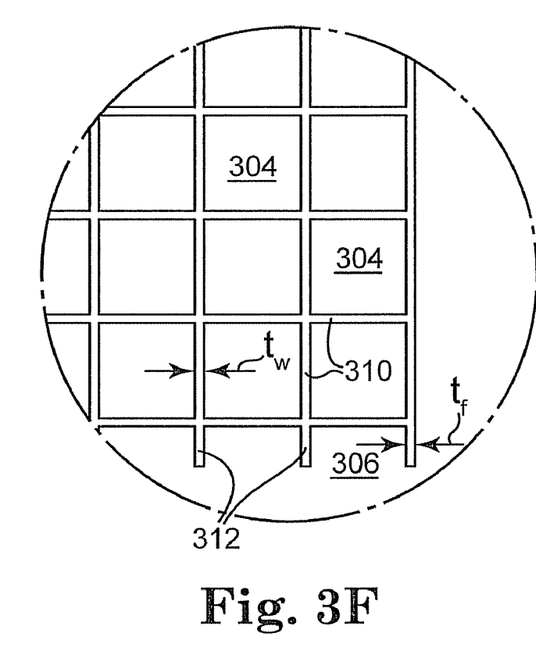
FIG. 3F is a greatly enlarged view of a portion of the electrode of FIG. 3E.
Figure 4:
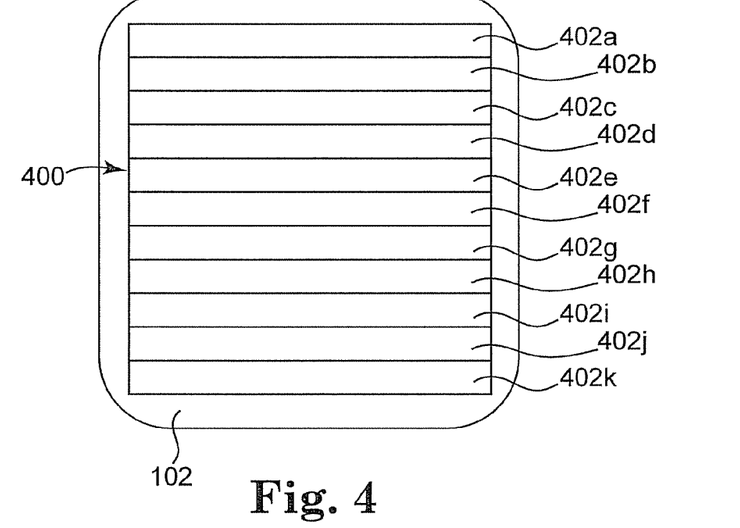
FIG. 4 depicts electrode plunge locations forming a die pattern on a workpiece.

The electrodes 108 of FIGS. 3A and 3B are illustrated as having an overall rectangular shape corresponding to a rectangular shape that is some fraction of the full die pattern 400 (FIG. 4). Non-rectangular die patterns may be formed as well, either with rectangular or non-rectangular electrodes 108. Depending on the die size, the width of the electrode 108 may correspond to the full width of the die pattern 400, one half the width of the die pattern, or some smaller fraction. The height of the electrode 108 is selected to produce a whole number of plunge locations 402 to machine the entire die pattern 400, such as in FIG. 4.

In one example, the pattern to be formed in a workpiece by the shaped electrode 108 is an array of pins and slots. The pattern is formed in the workpiece using the step-down plunge EDM process described above with respect to FIG. 2. FIG. 4 illustrates a full die pattern 400 on workpiece 102, with plunge locations 402a-402k (collectively plunge locations 402) on the workpiece 102. There are eleven plunge locations 402 illustrated in FIG. 4, but any other number of plunge locations 402 may be used. The number of plunge locations 402 will depend, for example, on the size of the full die pattern 400 and the size of electrode 108.

Figure 5A:
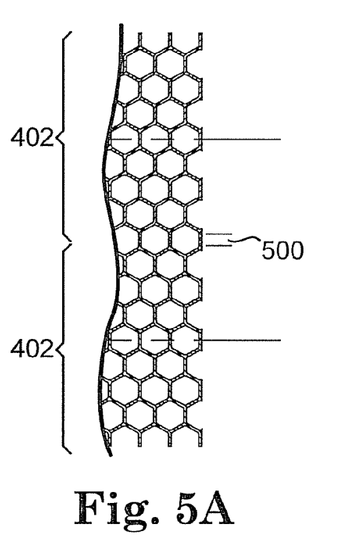
FIGS. 5A and 5B depict overlapping fin positions for adjacent electrode plunge locations.
Figure 5B:
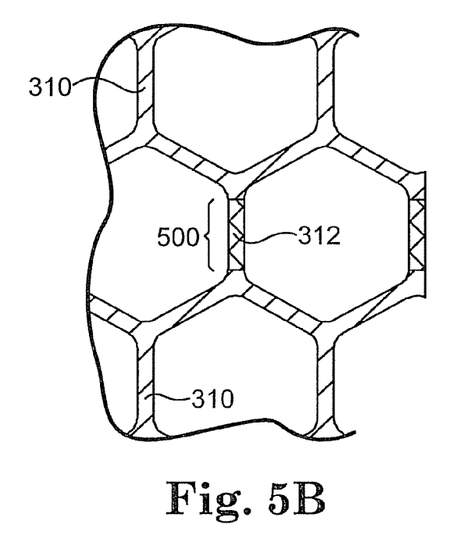

As illustrated in FIGS. 5A and 5B, the plunge locations 402 are such that the positions of fins 312 in each plunge location 402 overlap the position of the fins 312 in adjacent plunge locations. That is, for example, the positions of fins 312 for plunge location 402b overlap (at 500) the positions of fins 312 for adjacent plunge locations 402a and 402c. As described above, the fins 312 have a thickness $t_f$ that is less than the thickness $t_w$ of interconnected webs 310. The reduced fin thickness $t_f$ in the overlap areas 500 enables the resulting slot width in these "double plunge" overlap areas 500 to match that of the "single plunge" areas formed by the interconnected webs 310. Overlapping the fins 312 thus reduces slot width variability, improves die precision and reduces variability in substrates subsequently extruded through the die. The electrode 108 is moved between the plunge locations 402 in FIG. 4 to machine the full die pattern 400, i.e., the pins and slots, in the workpiece 102. In some implementations, a slot depth to width ratio of greater than 10:1 is used.

As one example, Table 1 below indicates plunge depth and plunge sequence for an exemplary step-down plunge machining process, where the full depth of the pattern 400, i.e., pins and slots, in the workpiece 102 is 0.08 inches, the selected number of plunge steps is 8, and there are eleven plunge locations 402a-402k, numbered 1-11 in Table 1.

TABLE 1

| PLUNGE STEP | DEPTH, INCHES | PLUNGE POSITION SEQUENCE | | | | | | | | | |
|---|---|---|---|---|---|---|---|---|---|---|---|
| 1 | 0.01 | 1 | 2 | 3 | 4 | 5 | 6 | 7 | 8 | 9 | 10 | 11 |
| 2 | 0.02 | 11 | 10 | 9 | 8 | 7 | 6 | 5 | 4 | 3 | 2 | 1 |
| 3 | 0.03 | 6 | 5 | 4 | 3 | 2 | 1 | 11 | 10 | 9 | 8 | 7 |
| 4 | 0.04 | 7 | 8 | 9 | 10 | 11 | 1 | 2 | 3 | 4 | 5 | 6 |
| 5 | 0.05 | 2 | 1 | 4 | 3 | 6 | 5 | 8 | 7 | 10 | 9 | 11 |
| 6 | 0.06 | 11 | 9 | 10 | 7 | 8 | 5 | 6 | 3 | 4 | 1 | 2 |
| 7 | 0.07 | 1 | 8 | 3 | 10 | 5 | 7 | 6 | 11 | 4 | 9 | 2 |
| 8 | 0.08 | 2 | 9 | 4 | 11 | 6 | 7 | 5 | 10 | 3 | 8 | 1 |

Figure 6:
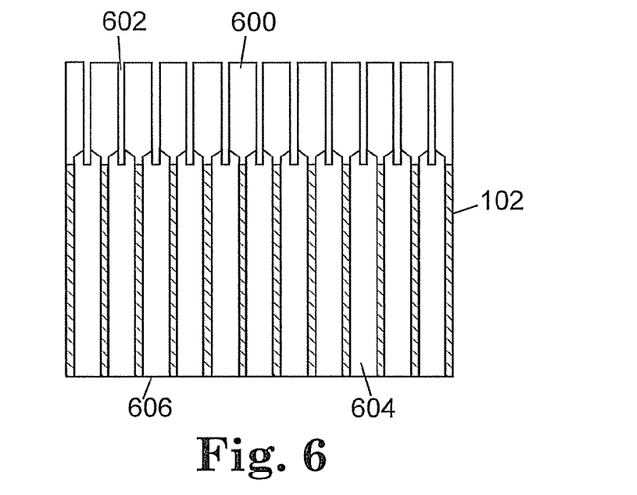
FIG. 6 is a vertical cross-section of an exemplary extrusion die manufactured using the electrode and plunge EDM process described herein.

FIG. 6 shows the workpiece 102 after forming pins 600 and slots 602 in the workpiece using a step-down plunge EDM process as described above. The pins 600 and slots 602 may be formed in the workpiece 102 in one or more phases. The first phase may be a roughing phase, where the pins 600 and slots 602 are machined to full depth using the step-down plunge EDM process. The second and subsequent phases may be finishing phases, where the pins 600 are finished to full depth. The step-down or one-shot plunge EDM process may be used for the finishing phases. To complete formation of an extrusion die, feedholes 604 can be formed in the workpiece 102. The feedholes 604 would typically extend from the base 606 of the workpiece 102 to the slots 602 in order to allow plasticized batch material to be supplied to the slots 502 and extruded therethrough. The workpiece 102 with the pins 600, slots 602, and feedholes 604 may serve as a template for other honeycomb extrusion dies. For example, the pins 600 may be modified as necessary to achieve other geometries more suitable for a particular application.

Figure 7:
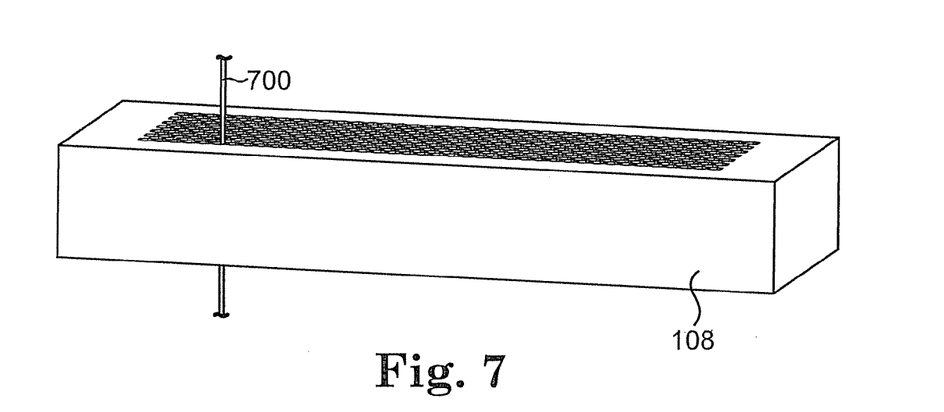
FIG. 7 illustrates a shaped electrode being formed using wire EDM.
Figure 8:
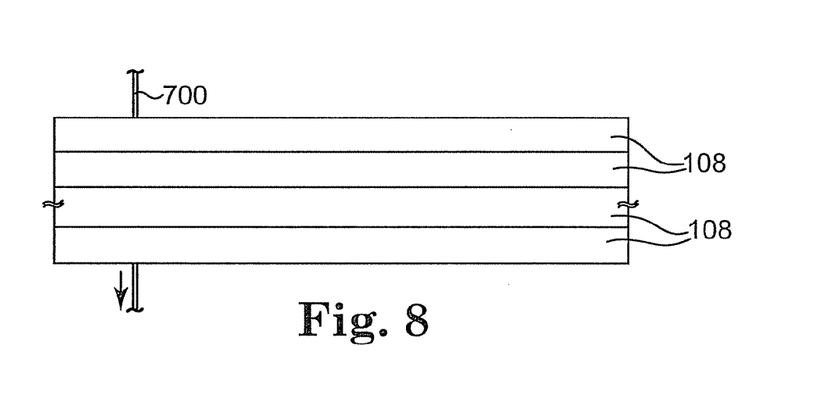
FIG. 8 illustrates a plurality of electrodes simultaneously being formed using wire EDM.

Shaped electrodes 108 may be formed by any suitable process. In one embodiment, as schematically illustrated in FIG. 7, shaped electrodes 108 are formed using a wire EDM process in which a traveling wire 700 is used to shape the electrode. As schematically illustrated in FIG. 8, using a wire EDM process, multiple electrodes 108 can be machined simultaneously by stacking multiple electrode blanks 800 and using a single traveling wire 700 to simultaneously machine the stacked blanks 800. In this manner, multiple electrodes 108 formed from blanks 800 match dimensionally, and thereby producing a high degree of consistency from electrode to electrode and from die to die manufactured using the simultaneously formed electrodes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electrode for machining a pattern in a workpiece, the electrode comprising:

a conductive body having a lattice of closed cells and a plurality of open cells, the open cells positioned at an edge of the lattice of closed cells;

wherein the closed cells are defined by interconnected webs and wherein the open cells are defined by fins extending from the interconnected webs; and wherein a thickness of the fins is less than a thickness of the webs.

2. The electrode of claim 1, wherein the interconnected webs defining the closed cells are arranged in a polygonal shape.

3. The electrode of claim 2, wherein the polygonal shape is one of rectangular, square, hexagonal, or triangular.

4. The electrode of claim 1, wherein the open cells are positioned at opposing edges of the lattice of closed cells.

5. The electrode of claim 1, wherein the thickness of the fins is in the range of 0.0001 inches to 0.0003 inch less than the thickness of interconnected webs.

6. A method of machining a pattern in a workpiece, comprising:

providing a shaped electrode including the pattern, the pattern defined by interconnected webs forming a lattice of closed cells, and fins extending from the interconnected webs to form open cells along at least one edge of the lattice of closed cells, wherein a thickness of the fins is less than a thickness of the webs;

positioning the electrode at a plurality of locations on the workpiece, wherein a position of the fins of the electrode at each location overlap a position of the fins of the electrode at an adjacent location;

forming the pattern at each of the plurality of locations by passing electrical charges repeatedly between the electrode and the workpiece and advancing the electrode into the workpiece.

7. The method of claim 6, wherein the forming step comprises:

advancing the electrode into the workpiece for a fraction of a full depth of the pattern; and repeating the positioning and forming steps a plurality of times until the full depth of the pattern has been formed at each of the plurality of locations.

8. The method of claim 6, wherein the positioning step comprises positioning the electrode at the plurality of locations in a varying sequence.

9. The method of claim 8, wherein the varying sequence is a random sequence.-

10. A method of machining a pattern in a workpiece, comprising:
    providing a shaped electrode including the pattern, the pattern defined by interconnected webs forming a lattice of closed cells, and fins extending from the interconnected webs to form open cells along at least one edge of the lattice of closed cells, wherein a thickness of the fins is less than a thickness of the webs;
    positioning the electrode at a first location on the workpiece;
    forming the pattern at the first location by passing electrical charges repeatedly between the electrode and the workpiece and advancing the electrode into the workpiece;
    positioning the electrode at a subsequent location on the workpiece such that a position of the fins of the electrode in the subsequent location overlap a position of the fins of the electrode in the first location; and
    forming the pattern at the subsequent location by passing electrical charges repeatedly between the electrode and the workpiece and advancing the electrode into the workpiece.

11. The method of claim 10, wherein the forming steps comprises:
    advancing the electrode into the workpiece for a fraction of a full depth of the pattern; and
    repeating the positioning and forming steps until a full depth of the pattern has been formed at each of the locations.

12. The method of claim 10, wherein positioning the electrode at the subsequent location comprises positioning the electrode at a predetermined and varying sequence of locations.

* * * * *